United States Patent
Narayanan

(10) Patent No.: US 9,077,623 B2
(45) Date of Patent: Jul. 7, 2015

(54) NETWORK MANAGEMENT SYSTEM SUPPORTING CUSTOMIZABLE GROUPS

(75) Inventor: Mahesh Narayanan, Andhra Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 12/966,836

(22) Filed: Dec. 13, 2010

(65) Prior Publication Data

US 2012/0151362 A1  Jun. 14, 2012

(51) Int. Cl.
- G06F 3/00 (2006.01)
- H04L 12/26 (2006.01)
- H04L 12/24 (2006.01)
- H04L 29/12 (2006.01)

(52) U.S. Cl.
CPC ....... H04L 43/0817 (2013.01); H04L 29/12226 (2013.01); H04L 41/0893 (2013.01); H04L 41/22 (2013.01); H04L 61/2015 (2013.01)

(58) Field of Classification Search
USPC .................................. 715/733–736; 345/660
See application file for complete search history.

(56) References Cited

U.S. PATENT DOCUMENTS

| | | | |
|---|---|---|---|
| 6,047,325 A | 4/2000 | Jain et al. | |
| 7,313,102 B2 | 12/2007 | Stephenson et al. | |
| 7,353,464 B1 * | 4/2008 | Kundu et al. | 715/853 |
| 7,366,989 B2 * | 4/2008 | Naik et al. | 715/736 |
| 7,443,870 B2 | 10/2008 | Zioulas et al. | |
| 7,519,700 B1 * | 4/2009 | Sapsford et al. | 709/223 |
| 7,792,058 B1 | 9/2010 | Yip et al. | |
| 7,849,174 B2 * | 12/2010 | Kawashima | 709/223 |
| 7,925,729 B2 * | 4/2011 | Bush et al. | 709/223 |
| 2002/0054169 A1 * | 5/2002 | Richardson | 345/854 |
| 2004/0177157 A1 | 9/2004 | Mistry et al. | |
| 2004/0249931 A1 * | 12/2004 | Garg et al. | 709/224 |
| 2005/0198259 A1 * | 9/2005 | Childress et al. | 709/224 |
| 2008/0052628 A1 * | 2/2008 | Bugenhagen et al. | 715/736 |
| 2008/0098308 A1 * | 4/2008 | Kortum et al. | 715/733 |

(Continued)

FOREIGN PATENT DOCUMENTS

| | | |
|---|---|---|
| CN | 101171583 | 4/2008 |
| CN | 101282330 A | 10/2008 |

OTHER PUBLICATIONS

"Managing Network Virtualization with Virtual Network Manager", Retrieved at << http://www.cisco.com/en/US/prod/collateral/netmgtsw/ps6504/ps6528/ps2425/white_paper_c11-541238-00.html >>, Retrieved Date: Oct. 13, 2010, pp. 27.

(Continued)

*Primary Examiner* — Kieu Vu
*Assistant Examiner* — Andrew Chung
(74) *Attorney, Agent, or Firm* — Danielle Johnston Holmes; Micky Minhas

(57) ABSTRACT

Attribute values in a customized logical group definition are displayed to a user, each customized logical group definition being associated with a network that includes multiple network entities, and each of the multiple network entities having one or more associated attribute values. A user selection of one of the different attribute values is received, and a determination is made of one or more of the multiple network entities that have an associated attribute value that matches the user selected attribute value. Identifiers of each of the one or more network entities that have an associated attribute value that matches the user selected attribute value are displayed.

20 Claims, 8 Drawing Sheets

(56) References Cited

U.S. PATENT DOCUMENTS

| | | | |
|---|---|---|---|
| 2008/0168356 A1* | 7/2008 | Eryurek et al. | 715/736 |
| 2008/0313539 A1* | 12/2008 | McClelland et al. | 715/705 |
| 2009/0187652 A1* | 7/2009 | Ho | 709/224 |
| 2009/0222547 A1* | 9/2009 | Boylan et al. | 709/223 |
| 2009/0254866 A1* | 10/2009 | Kugle et al. | 715/841 |
| 2010/0223274 A1* | 9/2010 | DeHaan et al. | 707/758 |

OTHER PUBLICATIONS

"Avaya Integrated Management", *Avaya Intelligent Communications Fact Sheet*, available at <http://www.avaya.com/usa/resource/assets/factsheet/Avaya%20Integrated%20Management%20UC4307.pdf>, pp. 1-4.

Chinese First Office Action and Search Report in Application 201110414198.4, mailed Nov. 21, 2013, 12 pgs.

Chinese Third Office Action in Application 201110414198.4, mailed Jan. 26, 2015, 6 pgs.

Chinese Second Office Action in Application 201110414198.4, mailed Jul. 28, 2014, 14 pgs.

* cited by examiner

NETWORK MANAGEMENT SYSTEM SUPPORTING CUSTOMIZABLE GROUPS

BACKGROUND

Many companies and other groups have networks of computers that are used by employees or group members, and/or that provide various services to other individuals or computers. While networking together large numbers of computers can be beneficial, it is not without its problems. One such problem is that it remains difficult for administrators of the infrastructure servers and other servers that service the computers and/or network to manage these infrastructure servers and other servers to have them running smoothly with good response time and reliability. In case of any issues, the administrators are expected to identify the cause of and resolve the issues in a reasonable amount of time so that it does not affect the business continuity/productivity of the network. The complexity increases for administrators to manage these entities in a geographically distributed environment. Similar situations need to be handled by network administrators in the organization with regard to Internet Protocol (IP) address space planning. That is, network administrators are expected to service requests for IP address space from the network in a reasonable amount of time while verifying that certain criteria that the requestor (e.g., an administrator representing a specific network) of the IP address space is to satisfy, from the utilization perspective of IP address space that was previously allocated to the requestor, is satisfied. The complexity also increases for network administrators to manage the IP address space in a geographically distributed environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple attribute values of multiple network entities are obtained and a record of the multiple attribute values maintained. Each of the multiple attribute values is associated with one of multiple attributes of one of the multiple network entities. An indication of one or more customized logical group definitions associated with a network that includes the multiple network entities is also obtained. Each of the one or more customized logical group definitions includes multiple different attribute values (e.g., that are logically and hierarchically grouped based on attributes). An indication of the health of one or more of the multiple network entities is displayed, and a user selection of one of the attribute values in one of the one or more customized logical group definitions is received. Based on the user selected one of the attribute values, an identifier of each of one or more of the multiple network entities having an attribute value matching the user selected one of the attributes values is displayed.

In accordance with one or more aspects, different attribute values in a customized logical group definition are displayed. The customized logical group definition is associated with a network that includes multiple network entities, each of the multiple network entities having one or more associated attribute values. An indication of the health of one or more of the multiple network entities is also displayed. A user selection of one of the different attribute values is received, and a determination is made of one or more of the multiple network entities that have an associated attribute value that matches the user selected attribute value. Identifiers of each of the one or more network entities that have an associated attribute value that matches the user selected attribute value are displayed.

BRIEF DESCRIPTION OF THE DRAWINGS

The same numbers are used throughout the drawings to reference like features.

DETAILED DESCRIPTION

A network management system supporting customizable groups is discussed herein. A network includes multiple computing devices that can communicate with one another. The network management system obtains attributes associated with a network entity, such as a network address range and/or server in the network. Various different attributes can be defined (e.g., a user responsible for maintaining operation of the network entity, a country in which the network entity is located, a building in which the network entity is located, and so forth), and an administrator can define any additional attributes that he or she desires. A record of the attribute values for these attributes for each network entity is maintained.

An administrator can also define different logical groups of network entities, customizing the logical group definitions in accordance with his or her desires. The logical group definitions include indications of one or more network entity attribute values, and once defined the administrator can select a particular logical group definition. Based on the network entity attribute values for the network entities, identifiers of the network entities that match the one or more attribute values of the selected logical group definition are displayed to the administrator. Various additional information (e.g., attribute values) regarding the network entities can also be displayed to the administrator. Additionally, the health of the network entity can be aggregated and rolled up along the logical hierarchy that is based on the definition of the selected logical group. Therefore, the administrator can filter the displayed network entities based on various network attributes and the aggregated health in order to further select which identifiers of network entities are displayed.

Figure 1:
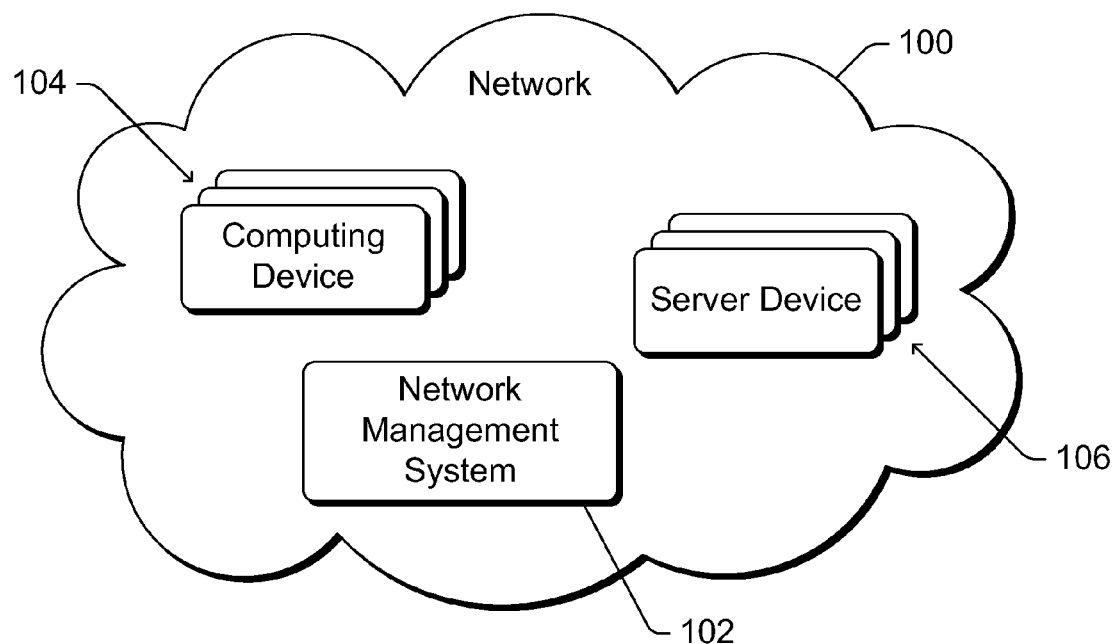
FIG. 1 illustrates an example network implementing the network management system supporting customizable groups in accordance with one or more embodiments.

FIG. 1 illustrates an example network 100 implementing the network management system supporting customizable groups in accordance with one or more embodiments. Network 100 includes one or more devices coupled together via a communication network. The communication network can include wired and/or wireless communications, and allows various ones of the devices in network 100 to communicate with various other devices in network 100. The communication network can be, for example, a local area network (LAN), a public telephone network, a private telephone network, other public and/or proprietary networks, combinations thereof, and so forth. The communication network can include various network communication devices, such as routers, gateways, firewalls, and so forth.

Network 100 includes a network management system 102 and various devices, including one or more computing devices 104 and one or more server devices 106. Computing devices 104 can be a variety of different types of devices, such as a desktop computer, a laptop or netbook computer, a tablet or notepad computer, a mobile station, a database or other storage device, an entertainment appliance, a set-top box communicatively coupled to a display device, a television or other display device, a cellular or other wireless phone, a game console, an automotive computer, and so forth.

Server devices 106 can be a variety of different types of server devices, such as standalone server devices, rack-mounted server devices, and so forth. Server devices 106 can provide functionality to other devices in network 100, such as data storage functionality, access control (e.g., domain controller) functionality, domain name system (DNS) server functionality, dynamic host configuration protocol (DHCP) server functionality, and so forth. Server devices 106 can additionally, or alternatively, provide functionality to devices that are not part of network 100, such as a social networking service, an email service, a messaging service, an image and/or video sharing service, a gaming or other entertainment service, and so forth.

Devices in network 100 can be located in the same geographic location (e.g., a data center, a building, an office, etc.). Alternatively, devices in network 100 can be distributed across multiple different geographic locations (e.g., different buildings, different states, different countries, etc.).

Network management system 102 manages information regarding various network entities in network 100 and makes that information available to administrators of network 100 and/or administrators of devices 104 or 106. A network entity refers to a device or other resource that is used in a network. For example, a network entity can be a computing device 104, a server device 106, a network address range, and so forth. Network management system 102 is implemented by one or more devices, such as one or more server devices 106 and/or other types of computing devices 104. Network management system 102 maintains various information regarding network entities in network 100 and provides a user interface (UI) allowing an administrator to provide information regarding network entities in network 100. Network management system 102 also provides a UI allowing an administrator to define logical groups for network entities and display which network entities are included in which logical groups. The administrator can be an administrator of network 100, being responsible for managing network address ranges and the network 100 as a whole. Alternatively (or additionally), the administrator can be an administrator of one or more devices (e.g., one or more server devices 106) in network 100, being responsible for managing one or more individual devices in network 100.

Figure 2:
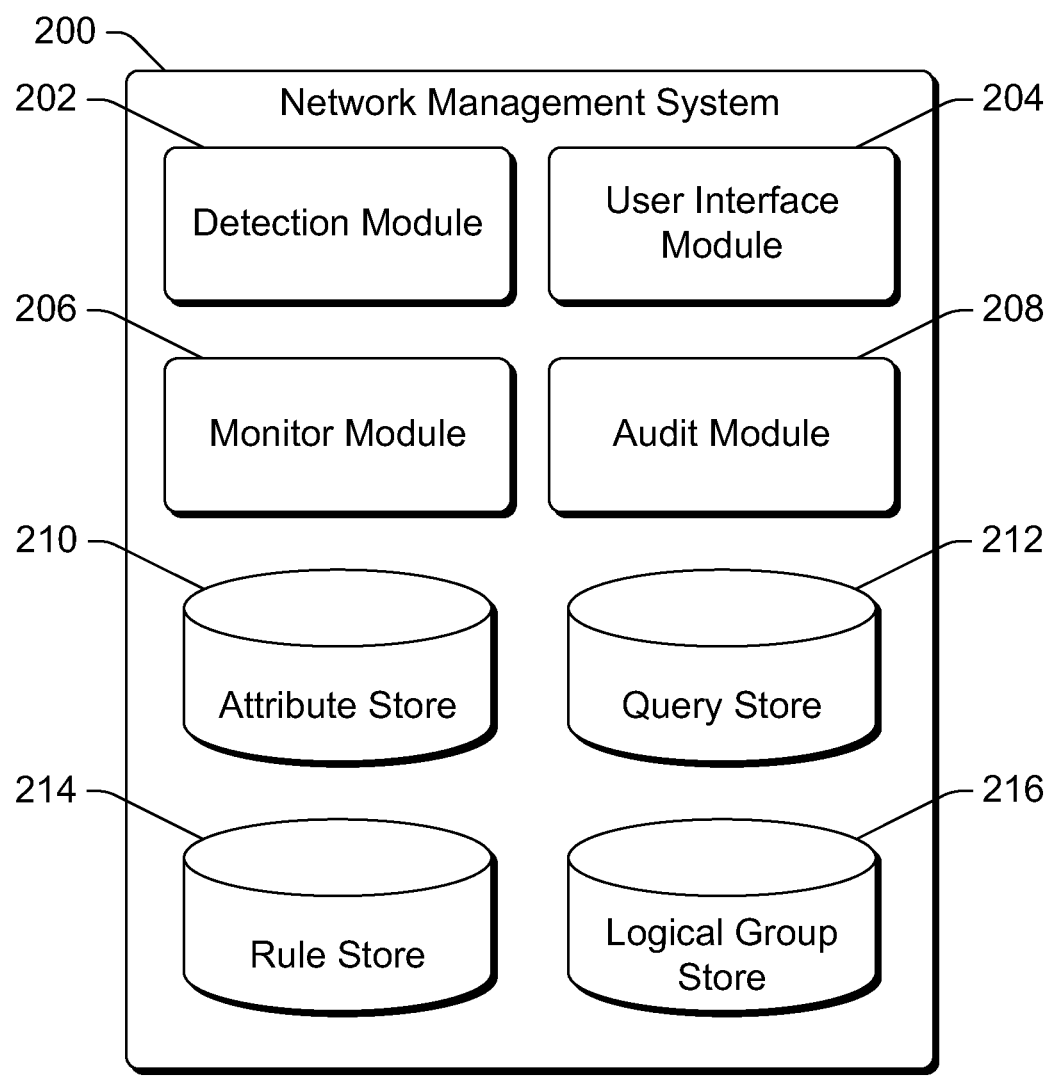
FIG. 2 illustrates an example network management system in accordance with one or more embodiments.

FIG. 2 illustrates an example network management system 200 in accordance with one or more embodiments. Network management system 200 can be, for example, a network management system 102 of FIG. 1. Network management system 200 manages information regarding various network entities in the network that includes network management system 200. Network management system 200 includes a detection module 202, a UI module 204, a monitor module 206, and an audit module 208. Network management system 200 also includes an attribute store 210, a query store 212, a rule store 214, and a logical group store 216.

Generally, detection module 202 obtains attribute values for network entities. UI module 204 displays or otherwise presents a user interface allowing a user of network management system 200 to view or otherwise consume information regarding the network entities. As used in the discussions herein, a user of network management system 200 refers to an administrator of at least part of the network that includes network management system 200 (e.g., network 100 of FIG. 1) and/or an administrator of a device or other network entity of the network that includes network management system 200. For example, a user can be an administrator of the entire network, an administrator of a portion of the network, an administrator of one or more server devices in the network, and so forth.

A user of network management system 200 can provide inputs to system 200 via UI module 204 in a variety of different manners. For example, inputs can be provided to a device implementing UI module 204 by the user pressing one or more keys of a keypad or keyboard of the device, pressing one or more keys of a controller (e.g., remote control device, mouse, trackpad, etc.) of the device, pressing a particular portion of a touchpad or touchscreen of the device, making a particular gesture on a touchpad or touchscreen of the device, and/or making a particular gesture on a controller (e.g., remote control device, mouse, trackpad, etc.) of the device. User inputs can also be provided via other physical feedback input to a device implementing UI module 204, such as tapping any portion of the device, an action that can be recognized by a motion detection component of the device (such as shaking the device, rotating the device, etc.), and so forth. User inputs can also be provided in other manners, such as via audible inputs to a microphone, via motions of hands or other body parts observed by an image capture device, and so forth.

Monitor module 206 monitors various information regarding network entities, such as the health of (including the utilization of) particular network entities as discussed in more detail below. Audit module 208 maintains a record of modifications to the various values and other information maintained by network management system 200, tracking when modifications are made and the user or module that made such modifications. Although each of modules 202-208 is illustrated as a separate module, it should be noted that one or more of modules 202-208 can be combined into a single module, and/or one or more of modules 202-208 can be separated into multiple modules.

Attribute store 210 stores attribute values obtained by detection module 202. Query store 212 stores indications of different queries or filters that been used by a user when viewing information regarding the network entities. Rule store 214 stores different rules used by user interface module 204 when displaying the user interface. Logical group store 216 stores indications of logical groups that have been defined for the network. Although each of stores 210-216 is illustrated as a separate store, it should be noted that one or more of stores 210-216 can be combined into a single store, and/or one or more of stores 210-216 can be separated into multiple stores. Each of stores 210-216 can be implemented in a variety of different manners, such as using a table, list, database, or other data structures.

Devices within a network are assigned a network address, such as an Internet protocol (IP) address (e.g., an IP version 4 (IPv4) address or an IP version 6 (IPv6) address). The particular network addresses that are available to be assigned to devices within the network are allocated by another service or device that is typically external to the network. For example, IP network addresses can be allocated to the network by the Internet Assigned Numbers Authority (IANA).

Network addresses that are allocated to a network can be assigned to devices in that network in different manners. For example, network addresses can be preconfigured in devices, can be assigned by a user of network management system 200, can be assigned automatically by a DHCP server, combinations thereof, and so forth.

In one or more embodiments, a network entity is a network address range, such as a range of network addresses allocated to the network by the IANA. Detection module 202 automatically detects address ranges that are allocated to the network, obtaining an indication of the address ranges allocated to the network from a variety of different devices or services. For example, an indication of the address ranges allocated to the network can be obtained from a DHCP server in the network, from the IANA, and so forth. Alternatively, detection module 202 can obtain an indication of one or more address ranges that are allocated to the network in other manners, such as from a user of network management system 200.

An indication of the utilization of the address ranges that are allocated to the network can also be automatically detected by detection module 202, obtaining an indication of the utilization of the address ranges that are allocated to the network from a variety of different devices or services. For example, an indication of the utilization of the address ranges can be obtained from a DHCP server in the network, from another device or module in the network, and so forth. Alternatively, detection module 202 can obtain an indication of the utilization of the address ranges that are allocated to the network in other manners, such as from a user of network management system 200. The utilization of the address ranges that are allocated to the network refers to an indication of how many of the network addresses in an address range that have been allocated to the network have been assigned to devices in the network. This indication can take a variety of different forms and can be generated in different manners, and in one or more embodiments the utilization of a particular address range is a percentage determined by dividing the number of network addresses in that particular address range that have been assigned to devices in the network by the total number of network addresses in that particular address range.

In one or more embodiments, a network entity is a server device, such as an individual server device within the network (e.g., a server device 106 of FIG. 1). Detection module 202 automatically detects server devices in the network, obtaining an indication of the server devices in the network from a variety of different devices or services. For example, an indication of the server devices in the network can be obtained from a DHCP server in the network, from a DNS system in the network, from the server devices themselves, and so forth. Alternatively, detection module 202 can obtain an indication of one or more server devices in the network in other manners, such as from a user of network management system 200.

A variety of different attributes are defined for the network entities, and each network entity has an associated attribute value for each of these different attributes. Different attributes can be defined for different types of network entities (e.g., different attributes can be defined for network entities that are network address ranges than are defined for network entities that are server devices), and/or the same attributes can be defined for different types of network entities. One or more of these attributes can be predefined by network management system 200 (or obtained from another device or service) and/or one or more of these attributes can be defined by a user of network management system 200. Thus, the different attributes defined for the network entities can be customized by a user of network management system 200.

A user of network management system 200 can define attributes for a network entity in a variety of different manners. In one or more embodiments, UI module 204 displays a user interface via which the user can define attributes by inputting text (or other characters are symbols), inputting audible commands, selecting items from lists, dragging and dropping images or icons, and so forth. In other embodiments, attributes can be defined in other manners, such as being defined in a document or file (e.g., a text document, an extensible markup language (XML) file, etc.) that is obtained by detection module 202.

An indication of the attributes that are defined for a network entity is maintained by network management system 200. This indication can be an explicit listing or description of the defined attributes. Alternatively, this indication can be inherent in the manner in which attribute values are stored. For example, a data structure used to store attribute values for network entities can include a field for each defined attribute.

A variety of different attributes can be defined for a network entity. Table I includes examples of different attributes that can be defined for a network entity. It should be noted that the attributes included in Table I are examples, and that not all of the attributes included in Table I may be defined for a particular network entity and/or additional attributes may be defined for a particular network entity. Additionally, a user of network management system 200 can define any attributes for network entities that he or she desires.

TABLE I

| Attribute | Description |
| --- | --- |
| Network type | A type of sub-network or domain that the network entity is part of (e.g., a sub-network or domain for a particular business division, for a lab or research division, for a legal division, for a financial division, and so forth). |
| Country | The country in which the network entity is located (e.g., in which a server device is physically located, or in which devices to which network addresses are assigned are physically located). |
| Site | The site (e.g., city, campus, etc.) in which the network entity is located (e.g., in which a server device is physically located, or in which devices to which network addresses are assigned are physically located). |
| Building | The building in which the network entity is located (e.g., in which a server device is physically located, or in which devices to which network addresses are assigned are physically located). |
| Owner | A user or group of users responsible for configuring and maintaining operation of the network entity. |
| Directory service site | Indication of a site or server that manages directory services for the network entity (e.g., a site supporting an Active Directory ® directory service, available from Microsoft Corporation of Redmond, Washington). |

Detection module 202 obtains attribute values for different network entities. Attribute values can be obtained from a user of network management system 200 or from another device or module. A user of network management system 200 can provide attribute values for a network entity in a variety of different manners. In one or more embodiments, UI module 204 displays a user interface via which the user can provide attribute values for particular network entities by inputting text (or other characters are symbols), inputting audible commands, selecting items from lists, dragging and dropping images are icons, and so forth. In other embodiments, attribute values for particular network entities are received from another device or module, such as being sent to detection module 202 in messages, being included in a document or file (e.g., a text document, an XML file, etc.) that is obtained by detection module 202, and so forth.

The obtained attribute values are maintained in attribute store 210, and can be stored in attribute store 210 in a variety of different manners. For example, the attribute values can be stored in a table, list, database, or other data structure.

A user of network management system 200 can also define different logical groups of network entities of the network. A logical group identifies one or more network entity attributes and one or more associated attribute values. One or more of these logical groups can be predefined (or obtained from another device or service) by a module of network management system 200 (e.g., detection module 202) and/or one or more of these logical groups can be defined by a user of network management system 200. Thus, the different logical groups can be customized by a user of network management system 200.

A user of network management system 200 can define logical groups in a variety of different manners. In one or more embodiments, UI module 204 displays a user interface via which the user can define logical groups by inputting text (or other characters are symbols), inputting audible commands, selecting items from lists, dragging and dropping images or icons, and so forth. In other embodiments, logical groups can be defined in other manners, such as being defined in a document or file (e.g., a text document, an XML file, etc.) that is obtained by detection module 202.

An indication of the logical groups of a network that are defined is maintained by network management system 200. This indication can be stored in logical group store 216 in a variety of different manners. For example, this indication of the logical groups of the network can be stored in a table, list, database, or other data structure. The defined logical group definitions can be subsequently retrieved from logical group store 216, such as when presenting a network entity display (e.g., a network layout display or server layout display) as discussed in more detail below.

In one or more embodiments, logical groups can be defined using a hierarchical structure having multiple levels. Each level corresponds to a particular attribute that has been defined for network entities or a classification or type of attributes. At one or more levels of this logical hierarchy, one or more nodes can be defined, each node having a particular attribute value for a particular attribute. Each node can be a child of a node in the next higher level of the hierarchical structure, and can also be a parent of one or more nodes in the next lower level a hierarchical structure.

Figure 3:
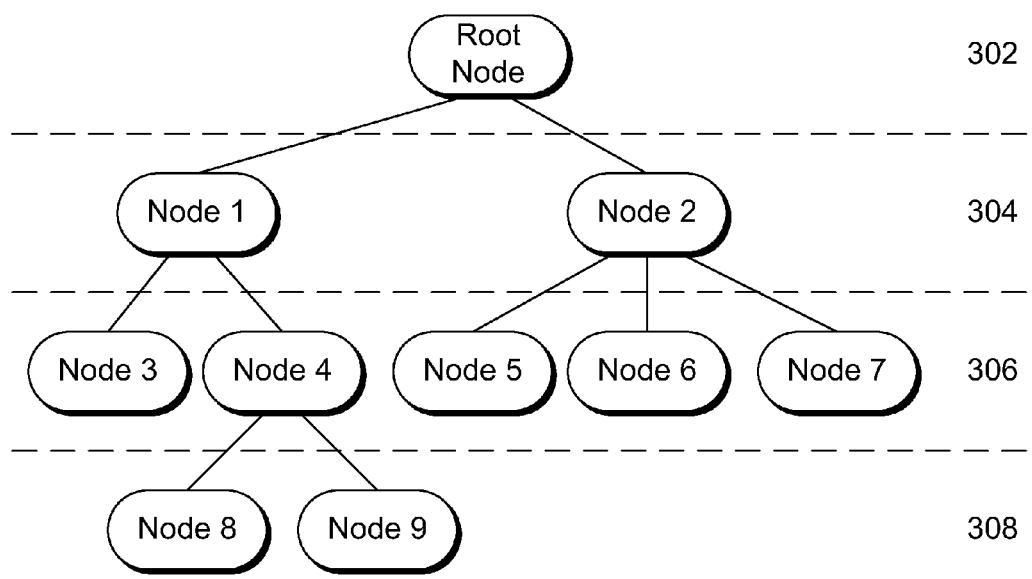
FIG. 3 illustrates an example hierarchical structure for a logical group in accordance with one or more embodiments.

FIG. 3 illustrates an example hierarchical structure 300 for a logical group in accordance with one or more embodiments. At a top or highest level 302 of hierarchical structure 300 is a root node. The root node is a parent of two nodes in the next lower level 304: node 1 and node 2. Node 2 is a parent of three nodes in the next lower level 306: node 5, node 6, and node 7. Similarly, node 1 is a parent of two nodes in the next lower level 306: node 3 and node 4. Node 4 is a parent of two nodes in the next lower level 308: node 8 and node 9. Level 308 is the bottom or lowest level of hierarchical structure 300.

In the example hierarchical structure 300, ten different nodes are shown. It should be noted that hierarchical structure 300 is an example, and that the hierarchical structure can include any number of nodes. Similarly, in the example hierarchical structure 300 four different levels are shown, although the hierarchical structure can include any number of levels.

Nodes in one or more levels of hierarchical structure 300 correspond to a particular classification (also referred to as a type) of attribute, while nodes in other levels of hierarchical structure 300 correspond to a particular attribute defined for network entities. Each node in hierarchical structure 300 corresponds to a particular classification of attribute or a particular attribute value.

For example, the root node in level 302 can correspond to the "Geography based" classification of attribute. Nodes in level 304 can correspond to the "Geo-Region" attribute, with node 1 corresponding to the "Geo-Region-North America" attribute value and node 2 corresponding to the "Geo-Region-European Union" attribute value. Nodes in level 306 can correspond to the "Country" attribute, with node 3 corresponding to the "Country-Canada" attribute value, node 4 corresponding to the "Country-USA" attribute value, node 5 corresponding to the "Country-United Kingdom" attribute value, node 6 corresponding to the "Country-France" attribute value, and node 7 corresponding to the "Country-Spain" attribute value. Nodes in level 308 can correspond to the "Site" attribute, with node 8 corresponding to the "Site-Mid West" attribute value and node 9 corresponding to the "Site-West" attribute value.

Returning to FIG. 2, it should be noted that the logical groups can be defined using a variety of different classifications or types of attributes. Any logical groups desired by a user of network management system 200 can be defined. Geography based classifications, as discussed above with reference to FIG. 3, are one example of classifications of attributes that can be used. By way of another example, logical groups can be defined based on business divisions, employee supervisor or management structure, types of services or functionality provided to other devices (e.g., devices that are not part of the network), and so forth. The particular nature of the hierarchical structure can vary based on a particular logical group that has been defined as well as the desires of a user of network management system 200. For example, following the geography based classifications, a parent of a node can correspond to a broader geographic region that includes the node (e.g., the parent of the node corresponding to the "Site-West" attribute value is the node corresponding to the "Country-USA" attribute value). By way of another example, following an employee management structure, a parent of a node can correspond to a manager or supervisor of the employee corresponding to the node.

UI module 204 uses these logical groups when displaying information regarding the network entities to a user of network management system 200. A user of network management system 200 can select a particular attribute value (e.g., a particular node) in a logical group, in response to which UI module 204 identifies the network entities that are associated with that particular selected attribute value and displays identifiers of those network entities. A particular network entity is associated with a particular attribute value if the particular network entity has a matching (e.g., the same as) attribute value as the particular attribute value. For example, a particular user selected attribute value can be "Country-USA" for an attribute of "Country". In this example, any network entity having an attribute value of "Country-USA" or "USA" for the network entity attribute of "Country" would be associated with that particular selected attribute value.

Whether an attribute value of a particular network entity matches a user selected attribute value can be determined in different manners. In one or more embodiments the two attribute values match if they are the same or identical. In other embodiments, other operators can be used to determine if the two attribute values match, such as a greater than operator, a less than operator, an "included in" operator, and so forth. For example, for the greater than operator, the two attribute values match if the attribute value of the particular network entity is greater than the user selected attribute value. By way of another example, for the "included in" operator, the two attribute values match if the attribute value of the particular network entity is included as one of one or more user selected attribute values.

In one or more embodiments, for the attribute values included in a logical group definition, the same attribute values and associated attributes are defined for the network entities. For example, an attribute of "State", an attribute of "Country", and an attribute of "Geo-Region" may be defined for the network entities, and also included in the logical group definition. Each network entity can be tagged with or assigned an attribute value for the "State" attribute, the "Country" attribute, and the "Geo-Region" attribute.

In other embodiments, for the attribute values included in a logical group definition, the same attribute values and associated attributes need not be defined for the network entities. Rather, a mapping or other indication of one attribute to another can be maintained and used to determine whether an attribute value of a particular network entity matches a user selected attribute value. For example, an attribute of "State" may be defined for the network entities, but no attribute of "Country" or "Geo-Region" may be defined for the network entities. Rather, the logical group definition (or another module or device) can include a mapping of which states are included in which countries and which geographical regions, and thus a mapping of "State" attribute values to "Country" attribute values and "Geo-Region" attribute values can be maintained. Based on this mapping, a determination can be readily made as to whether a network entity having a particular attribute value for the attribute of "State" matches a particular user selected attribute value for the attribute "Country" or the attribute "Geo-Region".

Various additional information regarding the network entities that are associated with a particular user selected attribute value can also be displayed to the user of network management system 200. This additional information can be, for example, any of the attribute values of those network entities that are associated with the particular selected attribute value. This additional information can also be audit information regarding modifications made to values or other information associated with the network entities as discussed in more detail below. This additional information can also be other information regarding the usage or other health of network entities as discussed in more detail below.

A user of network management system 200 can also define different rules for displaying identifiers of network entities. A rule is a set of one or more criteria identifying one or more attribute values that are to be matched by a network entity in order for an identifier of the network entity to be displayed and/or a manner in which information associated with the network entity is to be displayed. A rule can be based on attribute values and/or other characteristics of the network or a network entity. For example, a rule can be that a network entity having a particular attribute value be displayed in a particular manner (e.g., highlighted, with a particular icon, in a particular color, and so forth). By way of another example, a rule can be that utilization of a network address range be determined, and a utilization state displayed indicating that the network is under-utilized if the utilization is below a particular threshold and indicating that the network is over-utilized if the utilization is above another particular threshold.

One or more of these rules can be predefined (or obtained from another device or service) by a module of network management system 200 (e.g., detection module 202) and/or one or more of these rules can be defined by a user of network management system 200. Thus, the different rules that are defined can be customized by a user of network management system 200. A user of network management system 200 can define rules in a variety of different manners. In one or more embodiments, UI module 204 displays a user interface via which the user can define rules by inputting text (or other characters are symbols), inputting audible commands, selecting items from lists, dragging and dropping images or icons, and so forth. In other embodiments, rules can be defined in other manners, such as being defined in a document or file (e.g., a text document, an XML file, etc.) that is obtained by detection module 202.

An indication of the rules that are defined is maintained by network management system 200. This indication can be stored in rule store 214 in a variety of different manners. For example, this indication of the rules can be stored in a table, list, database, or other data structure.

Monitor module 206 monitors various information regarding network entities, such as the health of (including utilization of) particular network entities. This information can be provided to UI module 204 for display to a user of network management system 200.

In one or more embodiments, monitor module 206 monitors the health of server devices in the network. The health of a server device refers to whether, or how well, a server device is able to run and operate as intended (e.g., by a user of network management system 200). A server device can be referred to as being healthy if the server device is running without any known problems. A server device can be referred to as being unhealthy or not healthy if the server device is not running (e.g., has been powered down) or is malfunctioning (e.g., is powered on but operation has hung or stopped).

The health of a server device can be determined in different manners. In one or more embodiments, a separate device or module in the network is responsible for determining the health of server devices in the network. Monitor module 206 can obtain an indication of the health of the server devices in the network from this other device or module. In other embodiments, each server device is responsible for providing an indication of its health to monitor module 206. Monitor module 206 can determine that a particular server device is healthy if the server device provides an indication to module 206 that the server device is healthy, and can determine that the particular server device is not healthy if the server device provides an indication to module 206 that the server device is not healthy (or if no indication regarding health is received from the server device). In other embodiments, monitor module 206 can send requests to server devices in the network and determine the health based on the response, or whether it response, is received from the server devices. For example, module 206 can send a request (e.g., a ping request) to a server device and determine that the server device is healthy if the response is received and unhealthy if no response is received.

Audit module 208 maintains a record of modifications to the various values and other information maintained by network management system 200. These records, or portions thereof, can be provided to UI module 204 for display to a user of network management system 200.

A modification to a value or other information can be adding a value or other information, deleting a value or other information, and/or changing a value or other information. In one or more embodiments, audit module 208 tracks modifications to a value or other information, including recording what modification was made, a date and time when the modification was made, and an indication of the user or module that made the modification. A record of modifications to a particular value or information can be maintained along with that value or information in one of stores 210-216. For example, a record regarding modifications to an attribute value is maintained with that attribute value in attribute store 210. Alternatively, this record of modifications to a particular value or information can be maintained in a separate audit store (not shown) along with an identifier or a reference to the particular value or information that was modified.

Audit module 208 can determine which user made a modification in different manners, such as by identifying a particular user that is logged into network management system 200 at the time the modification is made. Audit module 208 can determine which module made a modification in different manners, such as by identifying a particular module from which a request to make the modification is received.

Audit module 208 can determine the date and time when a modification is made in different manners. For example, audit module 208 can maintain (or receive from another module or device) the current date and time, and add a timestamp to a record of a modification that indicates the date and time when the modification was added to a store 210-216 or a request to make the modification was received. By way of another example, a request received from another module can have a date and time included as part of the request, and that date and time can be added to a record of the modification.

Audit module 208 also includes an indication of the specific modification that was made. If the modification is adding of a value or information, then an indication of the value or information that is added is included in the record of the modification. If the modification is deleting a value or information, then an indication of the value or information that is deleted is included in the record of the modification. If the modification is changing a value or information, then an indication of the previous value or information and the new value or information is included in the record of the modification.

Figure 4:
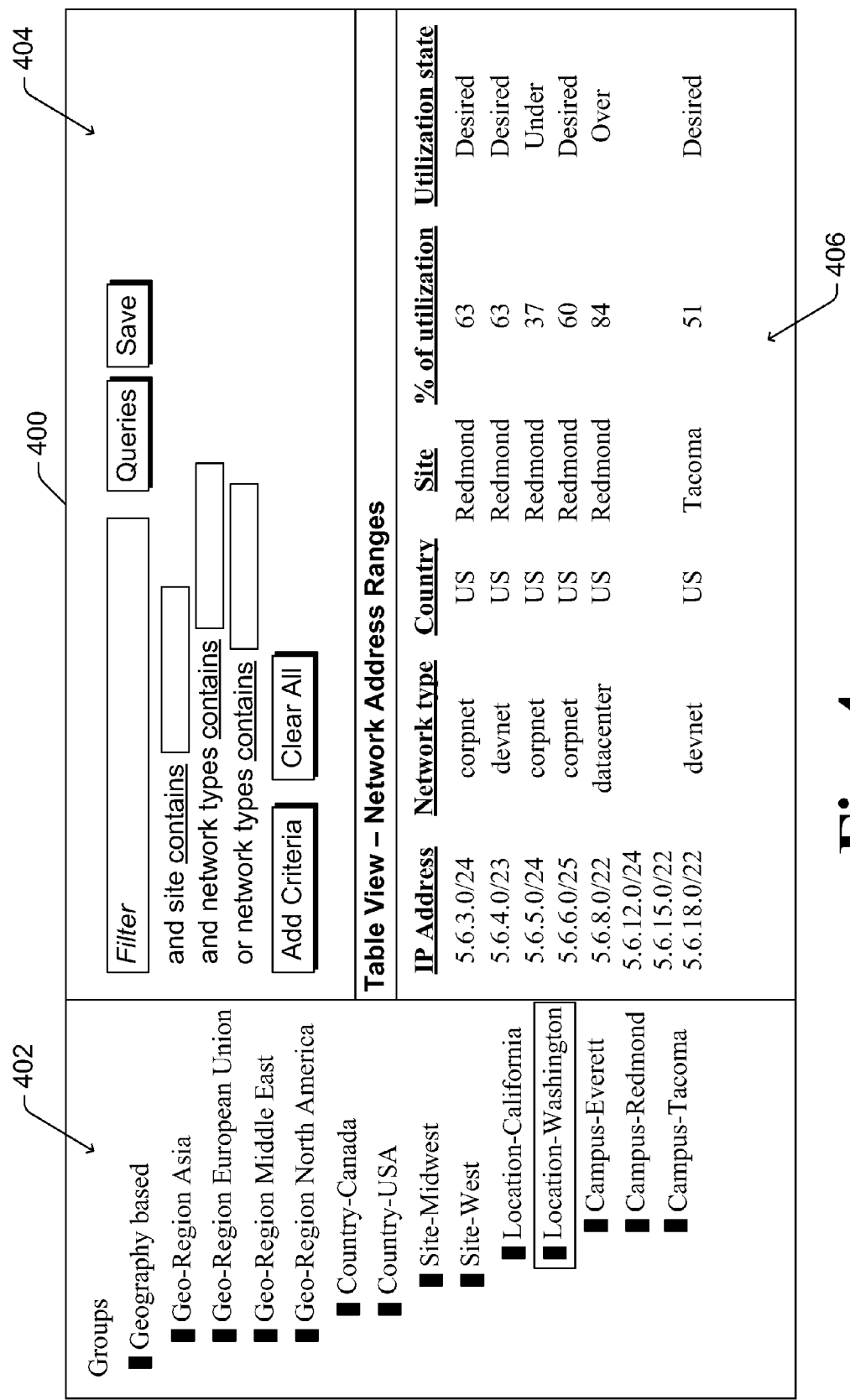
FIG. 4 illustrates an example network entity display that can be presented by a network management system in accordance with one or more embodiments.

FIG. 4 illustrates an example network entity display 400 that can be presented by a network management system in accordance with one or more embodiments. Display 400 is presented by a user interface module, such as user interface module 204 of FIG. 2. Display 400 illustrates an example network layout display in which information regarding various network entities that are address ranges is displayed. It should be noted that display 400 is an example, and that the network management system can present information using various different displays.

Display 400 includes a logical group portion 402, a query portion 404, and a network entity portion 406. Identifiers of various logical groups that have been defined are illustrated in logical group portion 402. The attributes and attribute values of the defined logical groups are illustrated in logical group portion 402, although alternatively only the attribute values may be displayed. In example display 400, the attributes and attribute values are a geography based classification of attributes. The illustrated attributes are "Geo-Region", "Country", "Site", "Location", and "Campus". The illustrated attribute values for the "Geo-Region" attribute are "Asia", "European Union", "Middle East", and "North America". The illustrated attribute values for the "Country" attribute are "Canada" and "USA". The illustrated attribute values for the "Site" attribute are "Midwest" and "West". The illustrated attribute values for the "Location" attribute are "California" and "Washington". The illustrated attribute values for the "Campus" attribute are "Everett", "Redmond", and "Tacoma". An indication of the hierarchical structure of the logical groups is also provided, with attribute values for logical groups lower in the hierarchical structure being offset further to the right than attribute values for logical groups higher in the hierarchical structure.

A user can expand or collapse attributes and attribute values in logical group portion 402, such as by selecting an icon adjacent to the attribute and attribute value to toggle between expanding and collapsing the attribute and attribute value. When expanded, attributes and attribute values for logical groups lower in the hierarchical structure are displayed, and when collapsed attributes and attribute values for logical groups lower in the hierarchical structure are not displayed. For example, when an icon adjacent to "Location-Washington" is expanded, the attributes and attribute values "Campus-Everett", "Campus-Redmond", and "Campus-Tacoma" are displayed. However, when an icon adjacent to "Location-Washington" is collapsed, the attributes and attribute values "Campus-Everett", "Campus-Redmond", and "Campus-Tacoma" are not displayed.

A user can also optionally define new logical groups via logical group portion 402. For example, the user can select a particular attribute or attribute value by providing a variety of different inputs to a user interface module as discussed above. In response to such a selection, the user can be presented with a data entry field allowing him or her to input a new attribute value (e.g., at the same or a lower level as the selected attribute or attribute value, or at a level selected by the user). E.g., the user could select the "Country-USA" attribute value, and input a new site attribute value in the data entry field when displayed.

In display 400, a user of the network management system has selected the attribute value of "Washington" for the attribute "Location". The user can select the attribute value by providing a variety of different inputs to a user interface module as discussed above. In response to user selection of the attribute value of "Washington" for the attribute "Location", network entities that are network address ranges having an attribute value that matches the attribute value of "Washington" are displayed in network entity portion 406. Although other network entities can be, and typically are, included in the network, they are not displayed in network entity portion 406 in response to user selection of the attribute value of "Washington" unless they have an attribute value that matches the attribute value of "Washington". In the illustrated example, the network entities are displayed in a table view format, although other formats can alternatively be used (e.g., an icon view format).

In the illustrated example, various information regarding the network entities that match the attribute value of "Washington" are displayed in network entity portion 406. This information includes an identifier of the network entity, such as "5.6.3.0/24" (indicating a range of 256 network addresses beginning at 5.6.3.0—e.g., all network addresses beginning with "5.6.3"), and "5.6.5.0/24" (indicating a range of 256 network addresses beginning at "5.6.5.0"—e.g., all network addresses beginning with "5.6.5"). This information also includes attribute values ("corpnet", "devnet", or "datacenter") for a network type attribute, attribute values ("US") for a "Country" attribute, and attribute values ("Redmond" or "Tacoma") for a "site" attribute. A network entity for which no other information is displayed (e.g., the "5.6.12.0/24" and "5.6.15.0/22" network entities) is a network entity that has not been assigned (e.g., no addresses in the address range are assigned to devices in the network).

This information in network entity portion 406 also includes an indication, for each network entity, of the amount of utilization of the network entity ("% of utilization"), and a utilization state ("Desired", "Under", or "Over") based on the amount of utilization of the network entity. This utilization state can also be referred to as an indication of the health of the network entity. For example, a network entity having a utilization state of "Desired" is healthy while a network entity having a utilization state of "Under" or "Over" is not healthy. Alternatively, the utilization state of "Desired", "Under", or "Over" can itself be the health of the network entity.

The utilization state is determined based on one or more defined rules (e.g., as maintained in rule store 214 of FIG. 2). For example, a rule can state that the network entity is under-utilized if the amount of utilization of the network entity is below a lower threshold value (e.g., less than or equal to 20%), and that a utilization state of "Under" is to be displayed for such a network entity. Similarly, a rule can state that the network entity is over-utilized if the amount of utilization of the network entity is above an upper threshold value (e.g., greater than or equal to 80%), and that a utilization state of "Over" is to be displayed for such a network entity. Accordingly, a utilization state of "Desired" is displayed for the network entities having an amount of utilization between the lower and upper threshold values (the "5.6.3.0/24", "5.6.4.0/23", "5.6.6.0/25", and "5.6.18.0/22" network entities). However, a utilization state of "Over" is displayed for the network entity having an amount of utilization above the upper threshold value (the "5.6.8.0/22" network entity), while a utilization state of "Under" is displayed for the network entity having an amount of utilization below the lower threshold value (the "5.6.5.0/24" network entity).

Additionally, in one or more embodiments network entity portion 406 and/or logical group portion 402 is color coded to identify whether network entities are healthy. One or more defined rules can indicate the appropriate color coding. For example, the UI module can highlight network entities in green to indicate they are healthy (e.g., have a utilization state of "Desired"), and highlight network entities in yellow or red to indicate they are not healthy (e.g., yellow if they have a utilization state of "Under" and red if they have a utilization state of "Over").

This color coding can also be carried over into logical group portion 402, with the identifier of the attribute value in portion 402 (or an icon adjacent to the identifier of the attribute value) being color coded as well. For example, the UI module can highlight the identifier of the attribute value (or an adjacent icon) red if at least one of the network entities having an attribute value that matches the attribute value in portion 402 has a utilization state of "Over". By way of further example, the UI module can highlight the identifier of the attribute value (or an adjacent icon) yellow if at least one of the network entities having an attribute value that matches the attribute value in portion 402 has a utilization state of "Under" and no network entities having an attribute value that matches the attribute value in portion 402 has a utilization state of "Over". By way of additional example, the UI module can highlight the identifier of the attribute value (or an adjacent icon) green if no network entities having an attribute value that matches the attribute value in portion 402 has a utilization state of "Under" and no network entities having an attribute value that matches the attribute value in portion 402 has a utilization state of "Over".

This color coding and logical group portion 402 is also rolled up along the logical group, being extended to higher levels of the hierarchical structure for the logical group. The health of the network entities including a particular attribute are thus aggregated together, providing an indication of whether one or more of the network entities at a particular level (or lower level) is not healthy. For example, the UI module can highlight the identifier of the attribute value (or an adjacent icon) red if an attribute value at a lower level in the hierarchical structure (at least one child node of the node that includes the attribute value) is highlighted red. By way of further example, the UI module can highlight the identifier of the attribute value (or an adjacent icon) yellow if the attribute value at a lower level in the hierarchical structure (at least one child node of the node that includes the attribute value) is highlighted yellow and no attribute values at a lower level in the hierarchical structure (none of the child nodes of the node that includes the attribute value) are highlighted red. By way of additional example, the UI module can highlight the identifier of the attribute value (or an adjacent icon) green if no attribute values at a lower level in the hierarchical structure (none of the child nodes of the node that includes the attribute value) are highlighted yellow and no attribute values at a lower level in the hierarchical structure (none of the child nodes of the node that includes the attribute value) are highlighted red.

As a more specific example, an icon adjacent to "Campus-Redmond" in logical group portion 402 can be red due to at least one network entity having the attribute value "Redmond" being over-utilized. An icon adjacent to "Campus-Tacoma" in logical group portion 402 can be green due to the one network entity having the attribute value "Tacoma" being neither over-utilized nor under-utilized. Similarly, an icon adjacent to "Campus-Everett" in logical group portion 402 can be green due to no network entity having an attribute value "Everett" being over-utilized or under-utilized. The red icon is also rolled up along the logical group, so that the icon adjacent to "Location-Washington", the icon adjacent to "Site-West", the icon adjacent to "Country-USA", the icon adjacent to "Geo-Region North America", and the icon adjacent to "Geography based" are all red due to at least one network entity having the attribute value "Redmond" being over-utilized.

Thus, the color coding can be applied to all of the attributes and attribute values in logical group portion 402, regardless of which attribute or attribute value is selected by the user. Alternatively, rather than color coding other identifications can be used to indicate whether network entities are healthy, such as highlighting without color, using different font types or font sizes, using icons, using animations, and so forth.

Using such color coding or other identifications allows the user of the network management system to quickly and easily identify network issues for which there may be an issue. For example, the user can readily see which geographical regions, countries, sites, etc. displayed in logical group portion 402 include address ranges that are over-utilized or under-utilized, and can expand the attributes and attribute values in logical group portion 402 to drill down to view information regarding a particular location or campus to which an allocated address range is over-utilized or under-utilized.

The user of the network management system can use the information presented in display 400 in a variety of different manners and to make a variety of different decisions. For example, the user can proactively monitor address ranges for different campuses and assign new address ranges to devices in those campuses when all of the currently allocated address ranges for that campus are over-utilized. By way of another example, if the user receives a request from an individual at a particular campus to be assigned additional address ranges, the user can readily identify the current utilization of address ranges at that campus and make a determination as to whether assignment of additional address ranges to that campus is appropriate.

Returning to FIG. 2, a user of network management system 200 can also define one or more queries (also referred to as filters) regarding the network entities. These queries include various criteria identifying one or more attribute values that are to be matched by a network entity in order for an identifier of the network entity to be displayed for a particular logical group. Any of the attribute values associated with the network entities can be included in a query. Various operators for determining whether one or more attribute values are matched by the network entity can be used with the criteria, such as whether one or more attribute values include the particular criteria, do not include the particular criteria, are greater than or equal to the particular criteria, are less than the particular criteria, and so forth.

One or more of these queries can be predefined (or obtained from another device or service) by a module of network management system 200 (e.g., detection module 202) and/or one or more of these queries can be defined by a user of network management system 200. Thus, the different queries that are defined can be customized by a user of network management system 200. A user of network management system 200 can define queries in a variety of different manners. In one or more embodiments, UI module 204 displays a user interface via which the user can define queries by inputting text (or other characters are symbols), inputting audible commands, selecting items from lists, dragging and dropping images or icons, and so forth. In other embodiments, queries can be defined in other manners, such as being defined in a document or file (e.g., a text document, an XML file, etc.) that is obtained by detection module 202.

An indication of the queries that are defined is maintained by network management system 200. This indication can be stored in query store 212 in a variety of different manners. For example, this indication of the queries can be stored in a table, list, database, or other data structure.

When identifiers of network entities are displayed, a user of network management system 200 can define a new query to further filter or select which identifiers are displayed. Alternatively, rather than creating a new query, the user can select a previously defined query to further filter or select which identifiers are displayed.

For example, referring again to FIG. 4, query portion 404 includes various buttons, icons, and/or data entry fields that allow queries to be defined, saved, and retrieved. A user can define a new query, inputting a name or identifier for the new query in the data entry field with the hint "Filter". The user can select the "Add Criteria" button or icon to add additional criteria to the query. In the illustrated example, the user has selected to add criteria for the site attribute, as well as criteria for the network types attribute. The user can input an attribute value that the site attribute is to have by inputting that attribute value in the data entry field adjacent to "and site contains". The word "contains" is underlined to indicate that it can be changed to different operators, such as "does not contain", "contains only", "is greater than", "is less than", and so forth. Similarly, the user can input an attribute value that the network type attribute is to have by inputting that attribute value in the data entry field adjacent to "and network types contains" or "or network types contains". The user can also select the "Clear All" button or icon to delete criteria that he or she has entered for this query.

Once the user has defined a new query, the user can select the "Save" button or icon to have the new query saved (e.g., in query store 212 of FIG. 2). The new query is saved with the name or identifier input by the user. Additionally, the user can select the "Queries" button icon to be presented with a list or other indication of the previously saved queries (e.g., by name or identifier as previously input by the user). The user can then select one of the previously saved queries to apply the criteria of that query to further filter or select which network entity identifiers are displayed.

Figure 5:
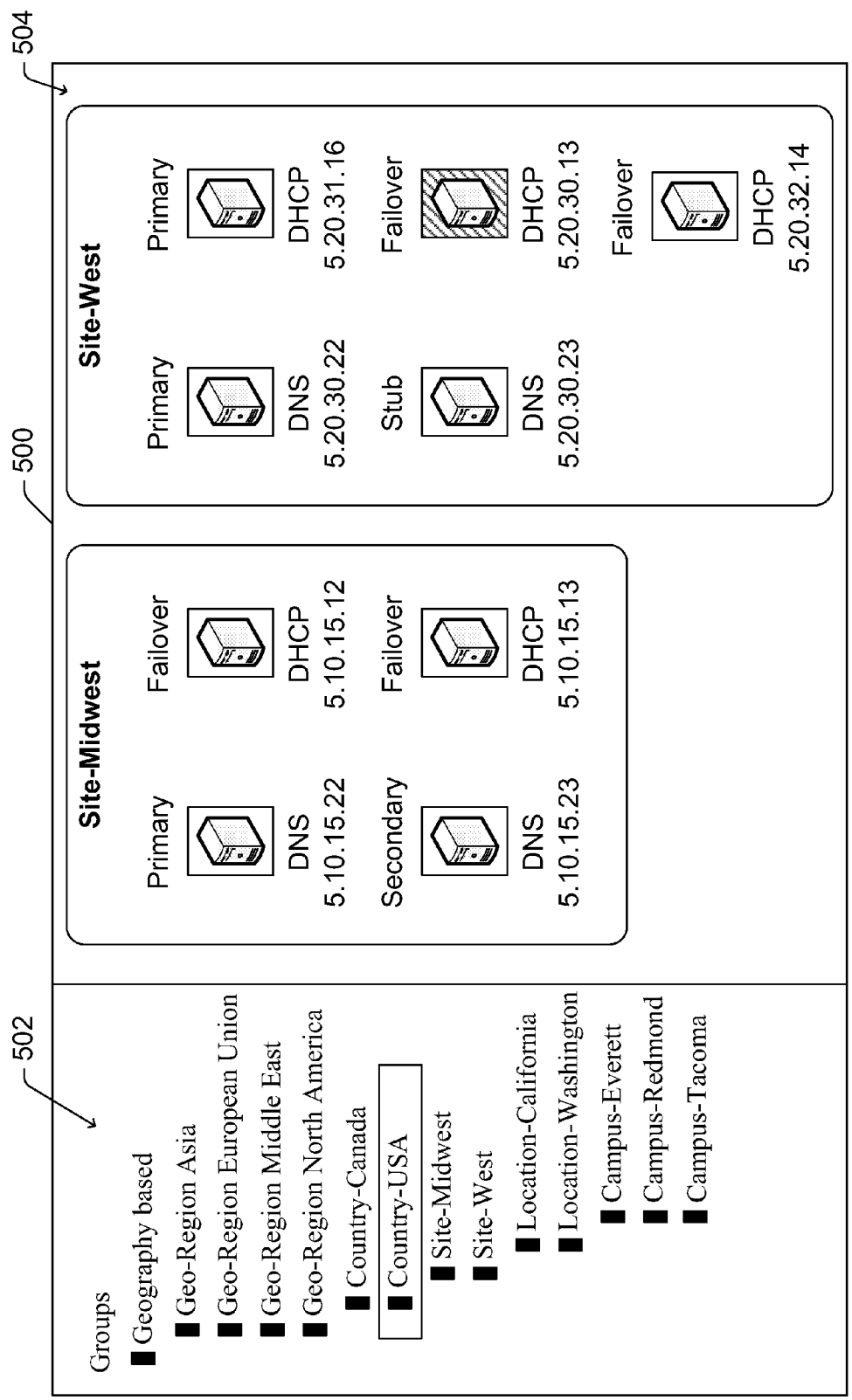
FIG. 5 illustrates another example network entity display that can be presented by a network management system in accordance with one or more embodiments.

FIG. 5 illustrates another example network entity display 500 that can be presented by a network management system in accordance with one or more embodiments. Display 500 is presented by a user interface module, such as user interface module 204 of FIG. 2. Display 500 illustrates an example server layout display in which information regarding various network entities that are server devices is displayed. It should be noted that display 400 is an example, and that the network management system can present information using various different displays.

Display 500 includes a logical group portion 502 and a network entity portion 504. Logical group portion 502 is analogous to logical group portion 402 of FIG. 4, although the "Country-USA" attribute value is selected in logical group portion 502 rather than the "Location-Washington" attribute value in logical group portion 402. Thus, it should be noted that the defined logical groups in FIGS. 4 and 5 are the same, even though the network entities are different (e.g., server devices in FIG. 5 rather than address ranges in FIG. 4).

In response to user selection of the attribute value of "USA" for the attribute "Country", network entities that are server devices having an attribute value that matches the attribute value of "USA" are displayed in network entity portion 504. Although other network entities can be, and typically are, included in the network, they are not displayed in network entity portion 504 in response to user selection of the attribute value of "USA" unless they have an attribute value that matches the attribute value of "USA". In the illustrated example, the network entities are displayed in an icon view format, although other formats can alternatively be used (e.g., a table view format).

In the illustrated example, various information regarding the network entities that match the attribute value of "USA" are displayed in network entity portion 504. This information includes a type of functionality provided by the server device (e.g., "DNS" or "DHCP"), a network address for the server device, and a type of the server device (e.g., "Primary", "Failover", or "Stub").

This information in network entity portion 504 also includes an indication, for each network entity, of the health of the entity. This indication can be provided in different manners. In the illustrated example, the box surrounding a server device is empty if the server device is healthy, and cross-hatched if the server device is not healthy. Accordingly, the server device having a network address of "5.20.30.13" can be readily seen as being not healthy. Alternatively, this indication can be provided in different manners, such as color coding (e.g., a green icon or box for healthy, a red icon or box for not healthy), highlighting icons without color, using different font types or font sizes, using different icon sizes, using animations, and so forth. Additionally, such indications of health can be carried over into logical group portion 502 and rolled up along the logical group, analogous to the discussion above regarding logical group portion 402 of FIG. 4.

Figure 6:
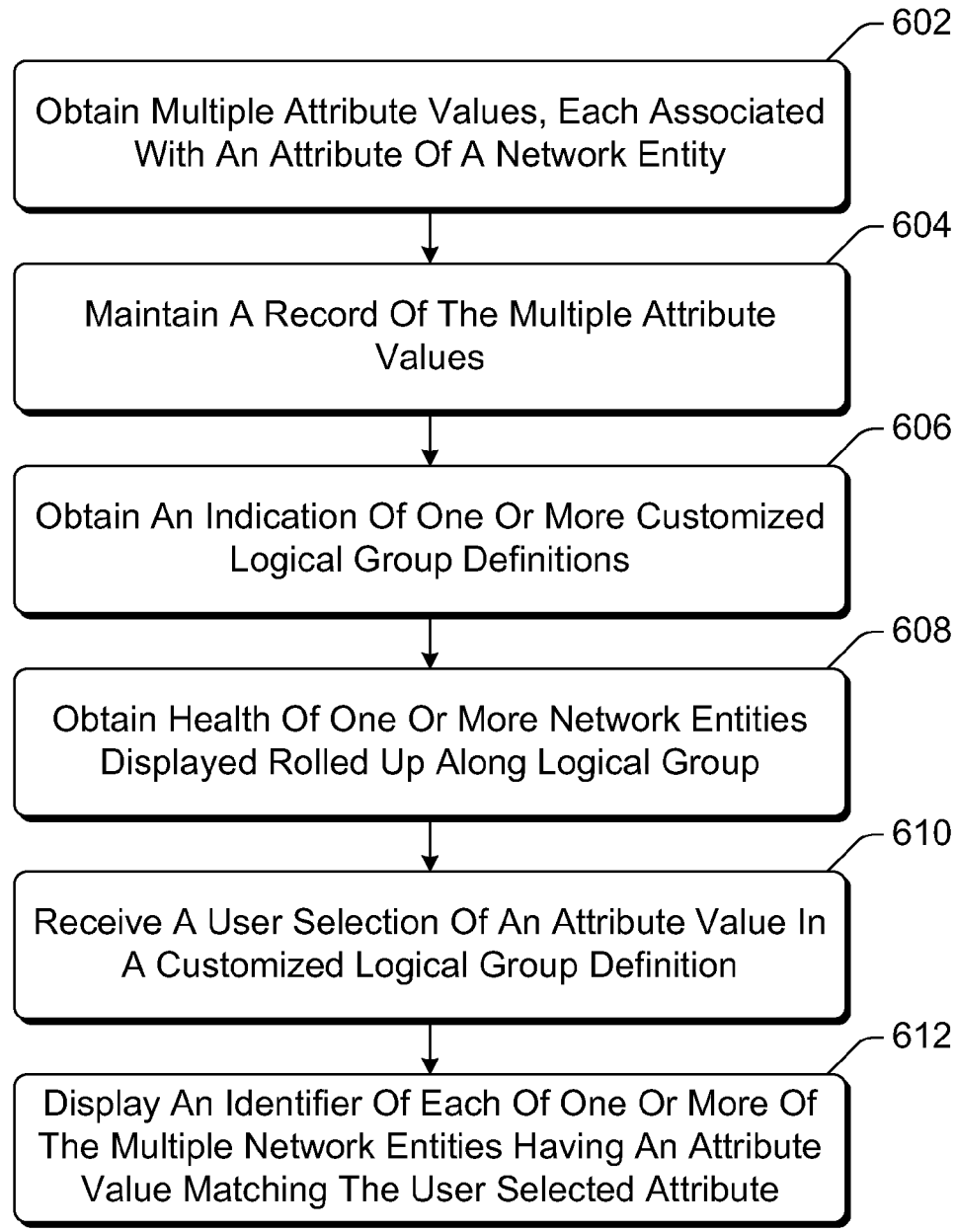
FIG. 6 is a flowchart illustrating an example process for implementing the network management system supporting customizable groups in accordance with one or more embodiments.

FIG. 6 is a flowchart illustrating an example process 600 for implementing the network management system supporting customizable groups in accordance with one or more embodiments. Process 600 is carried out by a network management system, such as network management system 102 of FIG. 1 or network management system 200 of FIG. 2, and can be implemented in software, firmware, hardware, or combinations thereof. Process 600 is shown as a set of acts and is not limited to the order shown for performing the operations of the various acts. Process 600 is an example process for implementing the network management system supporting customizable groups; additional discussions of implementing the network management system supporting customizable groups are included herein with reference to different figures.

In process 600, multiple attribute values are obtained (act 602). Each attribute value is associated with an attribute of one of multiple network entities as discussed above. These attribute values can be obtained in a variety of different manners as discussed above.

A record of the obtained attribute values is maintained (act 604). This record can be maintained in an attribute store as discussed above.

An indication of one or more customized logical group definitions is also obtained (act 606). A logical group can be defined in a variety of different matters as discussed above. The logical group definition can be obtained in act 606 by, for example, receiving a new logical group definition or retrieving a logical group definition from a logical group store as discussed above.

The health of one or more network entities is also obtained and displayed rolled up along the logical group (act 608). The health can be utilization of the network entity, the health of server devices, and so forth as discussed above. An indication of the health can be presented in different manners (such as using color coding) and is rolled up along the logical group as discussed above.

A user selection of an attribute value in a customized logical group definition is received (act 610). A variety of different attribute values can be associated with customized logical group definitions as discussed above.

An identifier of each of one or more network entities having an attribute value matching the user selected attribute is displayed (act 612). Whether an attribute value of a network entity matches the user selected attribute can be determined in different manners as discussed above. Additional information associated with the one or more network entities can also be displayed as discussed above.

Figure 7:
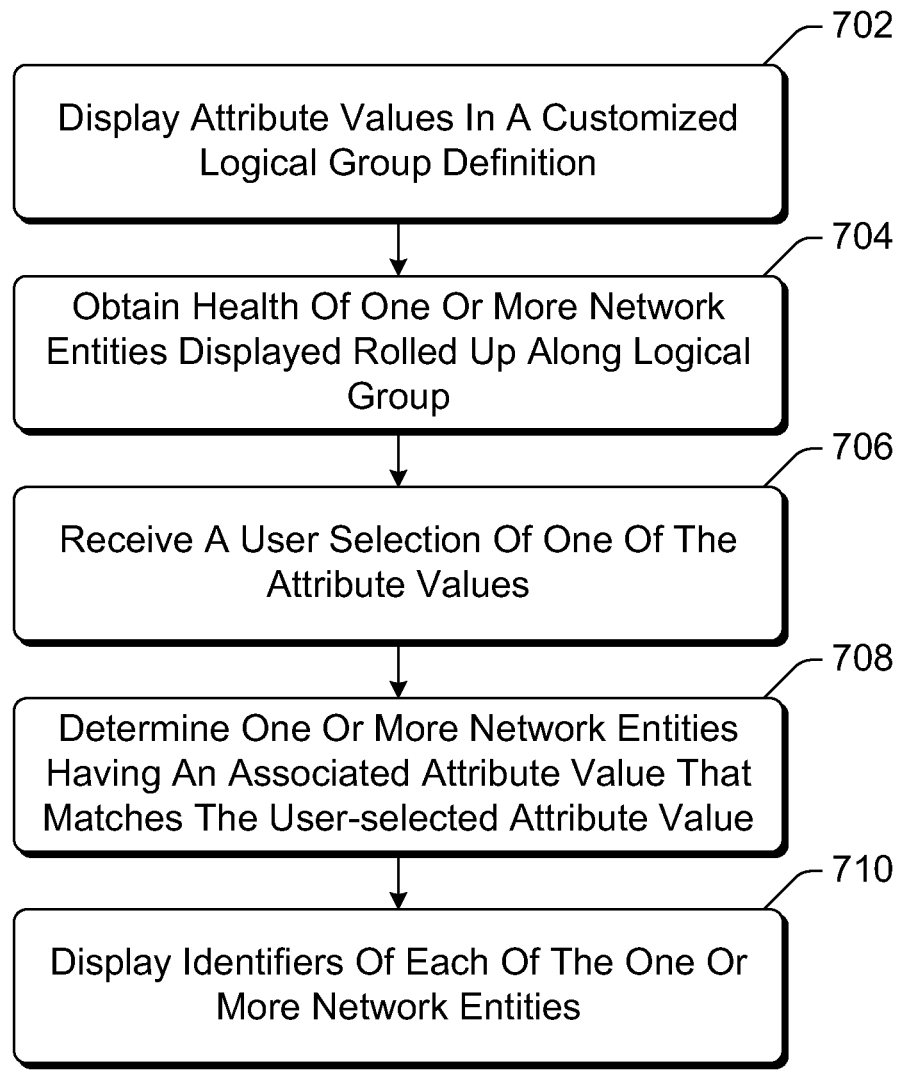
FIG. 7 is a flowchart illustrating another example process for implementing the network management system supporting customizable groups in accordance with one or more embodiments.

FIG. 7 is a flowchart illustrating another example process 700 for implementing the network management system supporting customizable groups in accordance with one or more embodiments. Process 700 is carried out by a network management system, such as network management system 102 of FIG. 1 or network management system 200 of FIG. 2, and can be implemented in software, firmware, hardware, or combinations thereof. Process 700 is shown as a set of acts and is not limited to the order shown for performing the operations of the various acts. Process 700 is an example process for implementing the network management system supporting customizable groups; additional discussions of implementing the network management system supporting customizable groups are included herein with reference to different figures.

In process 700, attribute values in a customized logical group definition are displayed (act 702). Various different attribute values can be included in a customized logical group definition as discussed above.

The health of one or more network entities is also obtained and displayed rolled up along the logical group (act 704). The health can be utilization of the network entity, the health of server devices, and so forth as discussed above. An indication of the health can be presented in different manners (such as using color coding) and is rolled up along the logical group as discussed above.

A user selection of one of the displayed attribute values is received (act 706). A user selection can be made by providing a variety of user inputs as discussed above.

In response to the user selection, one or more network entities having an associated value that matches the user selected attribute value are determined (act 708). Whether two attribute values match can be determined in different manners as discussed above.

An identifier of each of the one or more network entities determined in act 708 is displayed (act 710). Additional queries can be selected by the user to further filter or select which identifiers are displayed as discussed above.

Thus, a user of the network management system supporting customizable groups discussed herein can define any attributes and/or logical groups that are of interest to him or her, customizing the network management system to his or her desires. Once attributes and/or logical groups are defined, and attribute values obtained, the user can have various information regarding the network entities displayed to him or her in a manner that is of interest to him or her. For example, the user can select to have network entities displayed based on which network entities are associated with a particular building, which network entities are associated with a particular campus, which network entities are associated with a particular business division, and so forth.

It should be noted that the customization can be performed by the user, or alternatively by another service or individual on behalf of the user. For example, a user of the network management system can provide, to a system distributor or designer, an indication of the attributes and/or logical groups that are of interest to the user. The system distributor or designer can define the attributes and/or logical groups that are of interest to the user on the behalf of the user.

In the discussions herein, reference is made to displaying various data, identifiers, and other information to a user of the network management system. It should be noted that such data, identifiers, and/or other information can be presented to a user of the network management system in other manners in addition to, or alternatively in place of, displaying such data, identifiers, and/or other information. For example, such data, identifiers, and/or other information can be audibly played back to a user of network management system.

Figure 8:
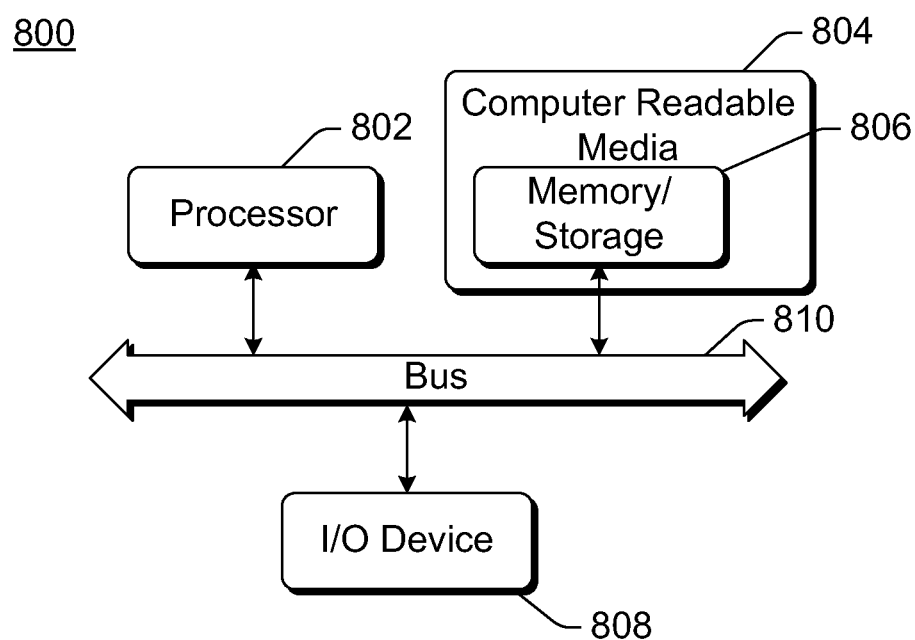
FIG. 8 illustrates an example computing device that can be configured to implement the network management system supporting customizable groups in accordance with one or more embodiments.

FIG. 8 illustrates an example computing device 800 that can be configured to implement the network management system supporting customizable groups in accordance with one or more embodiments. Computing device 800 can be, for example, a computing device 104 or server device 106 of FIG. 1, or can implement at least part of a network management system 102 of FIG. 1 or at least part of a network management system 200 of FIG. 2.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, applications, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the network management system supporting customizable groups techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining multiple attribute values of multiple network entities, each of the multiple attribute values being associated with one of multiple attributes of one of the multiple network entities;
   maintaining a record of the multiple attribute values;
   obtaining an indication of one or more customized logical group definitions associated with a network that includes the multiple network entities, at least one customized logical group definition defining, within a hierarchical structure, a hierarchical association between the multiple network entities based at least in part on:
      the multiple attributes corresponding to one or more levels of the hierarchical association, and
      the multiple attribute values corresponding to one or more nodes in the one or more levels of the hierarchical association;
   displaying, at a higher level of the hierarchical structure, an indication of the health of one or more of the multiple network entities at a lower level of the hierarchical structure, the indication of health including identification of utilization for at least one network address range having multiple network addresses and comprising an allocation value representing a total number of the network addresses of the network address range that are allocated to a network and a utilization state value indicating the health of the one or more network entities determined based on the allocation value;
   receiving a user selection of one of the multiple attribute values in one of the one or more customized logical group definitions; and
   displaying, within the hierarchical structure, and based at least in part on the user selected one of the multiple attribute values, the identifier of each of one or more of the multiple network entities having an attribute value matching the user selected one of the attributes values.

2. A method as recited in claim 1, wherein each of the multiple network entities comprises a network address range, and
   the allocation value displayed is determined by dividing a number of network addresses in the network address range that have been assigned by the total number of the network addresses in the network address range.

3. A method as recited in claim 1, wherein the displaying the indication of the health of the one or more of the multiple network entities comprises displaying an indication of whether one or more of the network address ranges is over-utilized or under-utilized.

4. A method as recited in claim 1, wherein each of the multiple network entities comprises a server device.

5. A method as recited in claim 4, wherein the displaying the indication of the health of the one or more of the multiple network entities comprises displaying an indication of whether one or more of the server devices is healthy or not healthy.

6. A method as recited in claim 1, wherein the one or more customized logical group definitions are user defined logical group definitions.

7. A method as recited in claim 1, wherein the displaying the identifier further comprises not displaying identifiers of ones of the multiple network entities not having an attribute value matching the user selected one of the attributes.

8. A method as recited in claim 1, further comprising:
receiving an indication of a user defined query to apply to the displayed identifiers, the user defined query identifying one or more attribute values; and
wherein the displaying comprises not displaying the identifier of one of the one or more of the multiple network entities if the one of the one or more of the multiple network entities does not have an attribute value matching the identified one or more attribute values.

9. A method as recited in claim 1, further comprising:
receiving a modification to one of the one or more customized logical group definitions; and
recording both an indication of the modification that was made to the one customized logical group definition and an indication of a user that made the modification.

10. A method as recited in claim 1, wherein one or more of the multiple attributes are user defined attributes.

11. A method as recited in claim 10, further comprising:
receiving a modification to one of the one or more user defined attributes; and
recording both an indication of the modification that was made to the one user defined attribute and an indication of a user that made the modification.

12. One or more computer storage media having stored thereon multiple instructions that, when executed by one or more processors of a computing device, cause the one or more processors to:
display different attribute values in a customized logical group definition, the customized logical group definition being associated with a network that includes multiple network entities, the customized logical group definition defining, within a hierarchical structure, a hierarchical association between the multiple network entities based at least in part on:
the multiple attributes corresponding to one or more levels of the hierarchical association, and
the multiple attribute values corresponding to one or more nodes in the one or more levels of the hierarchical association;
display, at a higher level of the hierarchical structure, an indication of the health of one or more of the multiple network entities at a lower level of the hierarchical structure, the indication of health including identification of utilization of at least one network address range having multiple network addresses and comprising an allocation value representing a total number of the network addresses of the network address range that are allocated to a network and a utilization state value indicating the health of the one or more network entities determined based on the allocation value;
receive a user selection of one of the different attribute values;
determine one or more of the multiple network entities that have an associated attribute value that matches the user selected attribute value; and
display, within the hierarchical structure, the identifiers of each of the one or more multiple network entities that have an associated attribute value that matches the user selected attribute value.

13. One or more computer storage media as recited in claim 12, wherein each of the multiple network entities comprises a network address range, and
the allocation value displayed is determined by dividing a number of network addresses in the network address range that have been assigned by the total number of the network addresses in the network address range.

14. One or more computer storage media as recited in claim 12, wherein to display the indication of the health of one or more of the multiple network entities is to display an indication of whether one or more of the network address ranges is over-utilized or under-utilized.

15. One or more computer storage media as recited in claim 12, wherein each of the multiple network entities comprises a server device.

16. One or more computer storage media as recited in claim 15, wherein to display the indication of the health of one or more of the multiple network entities is to display an indication of whether one or more of the server devices is healthy or not healthy.

17. One or more computer storage media as recited in claim 12, wherein the multiple attribute values associated with the multiple network entities are each associated with one of multiple attributes.

18. One or more computer storage media as recited in claim 17, wherein the customized logical group definition is a user defined logical group definition.

19. One or more computer storage media as recited in claim 12, wherein the multiple instructions further cause the one or more processors to:
receive an indication of a user defined query to apply to the displayed identifiers, the user defined query identifying one or more attribute values; and
wherein to display the identifiers is to display the identifiers of only the network entities that have an associated attribute value that matches the user selected attribute value and that have one or more associated attribute values that match the one or more attribute values of the user defined query.

20. A method comprising:
displaying different attribute values in a customized logical group definition, the customized logical group definition being associated with a network that includes multiple network entities, each of the multiple network entities being an address range and each of the multiple network entities having one or more associated attribute values, the displaying further comprising displaying an identification, for each particular one of the different attribute values in the customized logical group definition, of utilization of at least one address range that is associated with one or more network entity including whether an address range having an attribute value that matches a particular one of the different attribute values is over-utilized;

defining, within a hierarchical structure, a hierarchical association between the multiple network entities based at least in part on:
 the multiple attributes corresponding to one or more levels of the hierarchical association; and
 the multiple attribute values corresponding to one or more nodes in the one or more levels of the hierarchical association;
displaying, at a higher level of the hierarchical structure, an allocation value representing a total number of the network addresses of the identified address range that are allocated to a network and a utilization state value indicating the health of the one or more network entities determined based on the allocation value, wherein the utilization state comprises an indication of whether the at least one address range is over-utilized at a lower level of the hierarchical structure;
receiving a user selection of one of the different attribute values;
determining one or more of the multiple network entities that have an associated attribute value that matches the user selected attribute value; and
displaying, within the hierarchical structure, the identifiers of each of the one or more network entities that have an associated attribute value that matches the user selected attribute value, the displaying the identifiers further comprising displaying an identification, for each identifier, of a utilization of the identified address range.

* * * * *